Patented Apr. 10, 1945

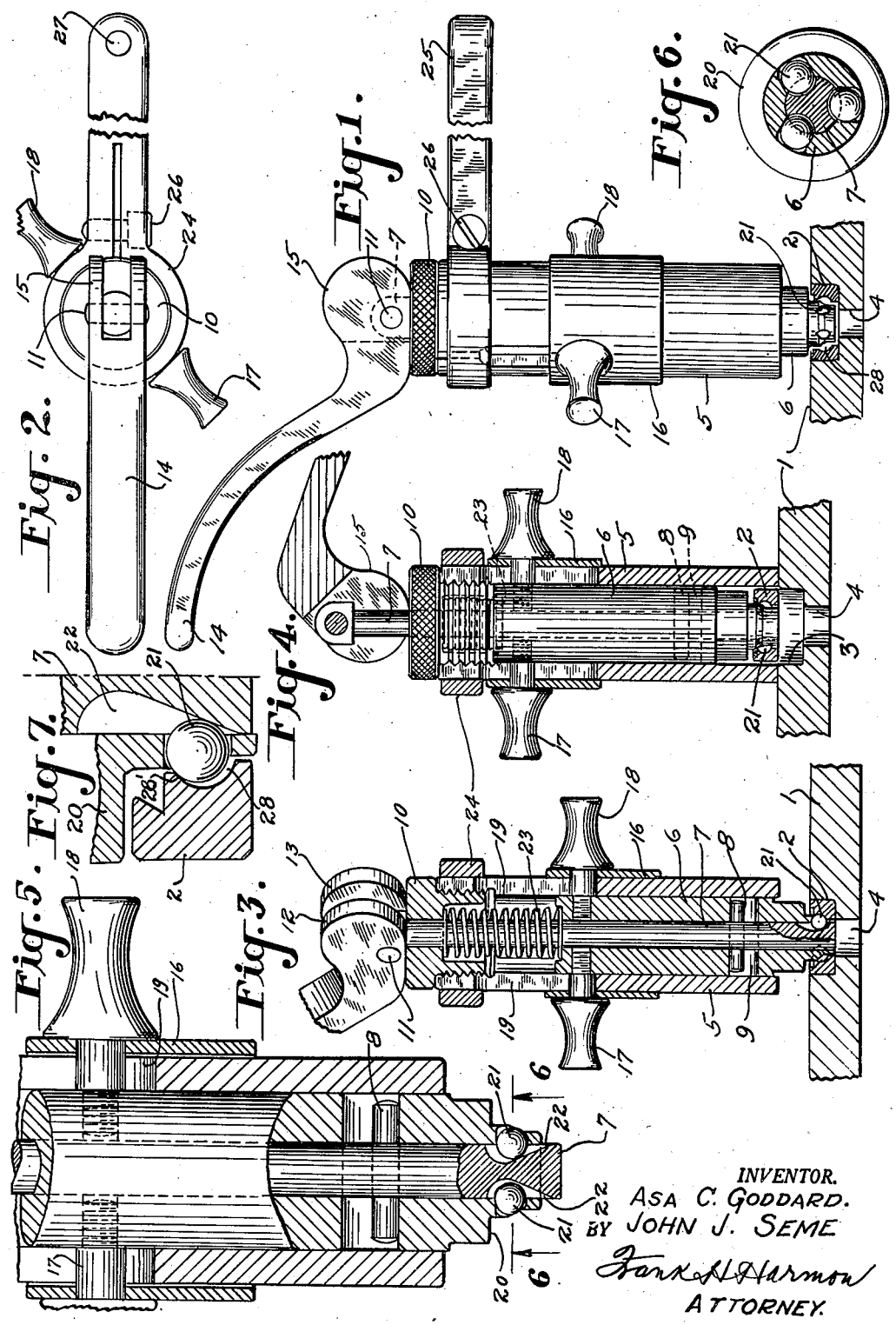

2,373,307

UNITED STATES PATENT OFFICE 2,373,307

BEARING RACE EXTRACTOR

Asa C. Goddard, Mentor, and John J. Seme, Maple Heights, Ohio, assignors, by mesne assignments, to Jack & Heintz, Inc., Cleveland, Ohio, a corporation of Ohio Application March 2, 1944, Serial No. 524,674

3 Claims. (Cl. 29—267)

This invention relates to bearing race pulling tools and has for its primary object to provide a simple self-contained compound tool capable of hand operation for quickly and efficiently engaging and pulling ball bearing races from sockets and also releasing the race from the tool for subsequent operation without damage to the race so that it may be used again.

To these and other ends it is proposed to provide a cylindrical assembly including a slidable holder for carrying a plurality of spaced balls about its cylindrical periphery and cooperating with an inner ball guide shaft to permit radial retraction of the balls to be inserted in the race, the holder being normally spring pressed to cause the balls to be extended radially outwardly sufficiently to securely engage the inner concave surface of the race. A hand operated cam lever is provided to bring about relative movement between the ball holder and an outer cylinder resting on the assembly and surrounding the socket from which the race is to be pulled as the ball holder with the balls engaging the race is moved to physically remove the race.

With the foregoing and other objects in view, the invention resides in the combination of parts and in the details of construction hereinafter set forth in the following specification and appended claims, certain embodiments thereof being illustrated in the accompanying drawing, in which:

Figure 1 is a view in elevation of the ball race pulling tool and showing in partial section a portion of an assembly with a ball race therein, the race engaging portion of the tool being shown in clamping engagement with the race;

Figure 2 is a top plan view of the same;

Figure 3 is a view in vertical section taken through the tool in its same position with respect to the race as shown in Figure 1;

Figure 4 is a similar view showing the race engaged by the tool and removed from the race carrying assembly;

Figure 5 is an enlarged partial view in vertical section through the tool showing the same so manipulated that the balls in the ball holder are in retracted position and bearing on the concave guideway in the guide shaft;

Figure 6 is a view in cross section taken along line 6—6 of Figure 5, showing the relationship between the balls and its holder and the guide shaft; and Figure 7 is a detail enlarged vertical sectional view of the ball and its relationship to the inner surface of the race upon upward pull of the tool in removing the race from its socket.

Referring more particularly to the drawing the part or assembly from which it is desired to remove the ball bearing race is shown at 1 and in Figures 1 and 3 the ball bearing race 2 is shown secured to the part 1 in the socket 3 above the bore 4 with its balls having previously been removed. The purpose of the hand tool is to remove the ball bearing race from the socket without damage to the race. Inasmuch as the exterior of the race is inaccessible to the gripping action of a tool, expansible means are employed to grip the interior concave surface of the race.

Accordingly the toool comprises a cylinder 5 inside of which is slidably fitted a block 6 bored longitudinally to slidably receive a rod 7. Rod 7 carries a cross pin 8 which extends through the rod into an enlarged slot 9 the upper and lower limits of which determine the limit of relative longitudinal movement between the rod and block 6. Cylinder 5 is open at its lower end and provided at its upper end with interior screw threads to receive a plug 10 which has a central opening to permit rod 7 to extend therethrough. Rod 7 also has a cross pin 11 extending therethrough and through the two forks 12 and 13 of a hand lever with a hand piece 14 and a cam 15 which bears on plug 10. Slidably fitted about cylinder 5 is a sleeve 16 provided with opposite openings to receive two hand pins 17 and 18 that extend through the sleeve 16 and the vertically elongated slots 19 of cylinder 5 and are removably screw threaded into block 6.

The block 6 is reduced in diameter near its bottom to form a shoulder 20 and therebelow is apertured to receive three or more balls 21 equidistantly spaced about its cylindrical periphery. The apertures are of such size that the balls, which are inserted from the interior of the block 6, protrude therethrough but are slightly smaller than the diameter of the balls so that they are retained between the block and the vertical arcuate recessed guideways 22 for each ball in the outer surface of rod 7.

Confined between the screw barrel of plug 10 and the upper surface of plug 6 is a compression coil spring 23 the effect of which is to force block 6 downwardly to the position shown in Figure 3 where cross pin 8 is its stop limit. Cylinder 5 has a fixed position with respect to rod 7 through the screw plug 10. The sleeve 16 through its pins 17 and 18 being screwed into the block are normally in this lower position of Figure 3 by reason of spring 23.

When it is desired to remove ball bearing race 2 from its socket 3 the first operation is to grasp the tool and exert an upward pull on the pins 17 and 18. This results in a straight upward pull on block 6 against the action of spring 23 for a distance limited by abutment of pin 8 with the lower extremity of slot 9 in block 6, as shown in Figure 5, wherein it will be seen that the balls 21 are in registry with the center of the arcuate guides 22 which is the point of smallest diameter of rod 7. With the balls thus in position for retraction within the confines of the diameter of race engaging portion of the ball holding block, the same is inserted therein after which the manual upward pull on pins 17 and 18 is released. This permits spring 23 to force block 6 downwardly into the position shown in Figure 3. As the balls 21 roll downwardly in guides 22 they are forced outwardly into snug and positive pressure engagement with the concave inner surface of the ball race.

With the tool thus in engagement with the race the hand lever 14 is rotated about its pivot 11, which is its connection to rod 7, in a clockwise direction from its position of Figure 1 and Figure 3, into the position shown in Figure 4. The action of cam 15 is to ride on plug 10, and against the action of spring 23, pull rod 7, block 6 and sleeve 16 upwardly and simultaneously push cylinder 5 downwardly. In Figure 4 the lower edge of cylinder 5 is resting on part 1 surrounding the race and its socket and the race in engagement with balls and completely removed.

As shown in Figure 7, the angle of vertical curvature of the guideways 22 is carefully and accurately predetermined with respect to the concavity of the inner surface 28 of the ball race so that as the balls 21 are in extended position and an upward pull exerted by operating the cam lever to the position of Figure 4, the balls engage the point 28' at a tangent to the balls 21 and thus do not bear against that portion of the inner surface of the race actually occupied by the ball bearings of the ball bearing assembly. This materially lessens the possibility of damaging the race which might prevent its reuse.

Having thus removed the race from its socket the race must be removed from the tool for the next race pulling operation. This is easily accomplished by rotating hand cam lever to its normal position of Figures 1 and 3 and then pulling upwardly on pins 17 and 18 to bring the tool into the position shown in Figure 5. The balls being thus in retractible position in their guides 22, the race is easily removed from the tool.

Should it be found desirable to clamp the tool in position so that one hand is free for alternate manipulation of the cam lever and the hand pins 17 and 18 while the other hand is free to hold the part 1 and the ball race, a clamp bracket may be employed and comprise a loop 24 to surround cylinder 5 with a complementary split portion 25 with a tightening cross pin 26 and one or more holes 27 for attachment to any convenient support.

It will be appreciated that due to the fact that the cam lever bears directly on the top of the knurled plug 10 and that the latter is screwthreadedly connected to cylinder 5, the extent to which the plug is screwed into the cylinder effects an adjustment of the throw of the cam lever to the length of ball race withdrawal required. In other words, for a relatively short pull, the plug is not screwed in to the limit whereas for a relatively long pull the plug is screwed in to its fullest extent. Locking means of any suitable type may be employed for holding the plug in any adjusted position.

Thus by means of the foregoing it will be seen that there has been provided a simple and efficient hand tool which is self-contained and that requires only the operation of hand pins 17 and 18 to permit insertion of the tool in the race in its socket, the operation of the hand cam lever in one direction to withdraw the race from its socket, a reverse operation of the cam lever and a pull on pins 17 and 18 to free the race from the tool. The foolproof nature of the tool and its simplicity of design lends itself to speed in repeated ball bearing race pulling operations without damage to the races as they are removed from their sockets so that they may be used again in ball bearing assemblies.

We claim:

1. In a device for engaging and removing undercut ball bearing races from sockets, a tubular member having radial peripherally arranged openings and a plurality of peripherally spaced balls carried thereby so as to be radially movable therein, a rod mounted for limited relative longitudinal movement in said tubular member and having longitudinally arcuate guideways for said balls, manual means for moving said tubular member in one direction longitudinally of said rod for radially retracting said balls for insertion of the same into the race, spring means for automatically moving said tubular member in one direction for projecting said balls into binding relationship with the interior of said race, a cylinder mounted slidably about said tubular member, a sleeve slidably mounted on said cylinder, hand gripping elements removably secured to said tubular member and free to move in slots in said cylinder to pull said tubular member longitudinally of said rod to cause radial retraction of said balls in said arcuate slots and a manually operable cam lever connected to said rod and bearing on said cylinder for simultaneously exerting a pull on said rod and through said rod on the tubular member and a push on said cylinder to remove said race from the socket.

2. In a device for engaging and removing undercut ball bearing races from sockets, a tubular member having radial peripherally arranged openings and a plurality of peripherally spaced balls carried thereby so as to be radially movable therein, a rod mounted for limited relative longitudinal movement in said tubular member and having longitudinally arcuate guideways for said balls, manual means for moving said tubular member in one direction longitudinally of said rod for radially retracting said balls for insertion of the same into the race, spring means for automatically moving said tubular member in one direction for projecting said balls into binding relationship with the interior of said race, a cylinder mounted slidably about said tubular member, a sleeve slidably mounted on said cylinder, hand gripping elements removably secured to said tubular member and free to move in slots in said cylinder to pull said tubular member longitudinally of said rod to cause radial retraction of said balls in said arcuate slots and a manually operable cam lever connected to said rod and bearing on said cylinder for simultaneously exerting a pull on said rod and through said rod on the tubular member and a push on said cylinder to remove said race from the socket, means for adjusting the effective length of said cylinder for effecting an adjustment of the throw of said cam lever for adjusting its effective ball race extracting stroke.

3. In a device for engaging and removing undercut ball bearing races from sockets, a tubular member having radial, peripherally spaced openings near one end thereof and a plurality of peripherally spaced balls carried in said openings so as to be radially movable therein, a rod mounted for limited relative longitudinal movement in said tubular member and having longitudinally arcuate guideways for said balls, manually operable means connected to said tubular member for moving the latter longitudinally of said rod for removing or applying outward pressure on said balls in their guideways to permit their retraction and insertion into the race, spring means for automatically moving the tubular member relatively to the rod to project said balls radially outwardly by outward pressure in their guideways upon manual release of said manual means and into binding relationship with the interior of said race, a cylinder mounted slidably about said tubular member and a manually operable cam lever connected to said rod and bearing on said cylinder for simultaneously exerting an upward pull on said rod and through said rod on the tubular member and a downward pressure on said cylinder to remove said race from the socket.

ASA C. GODDARD.
JOHN J. SEME.